(12) United States Patent  (10) Patent No.: US 7,697,679 B2
Cannata  (45) Date of Patent: Apr. 13, 2010

(54) TELEPHONE SET HAVING A HANDSET WITH AN INTEGRATED POINTING DEVICE

(75) Inventor: Frank J. Cannata, Littleton, MA (US)

(73) Assignee: 3Com Corporation, Marlborough, MA (US)

( * ) Notice: Subject to any disclaimer, the term of this patent is extended or adjusted under 35 U.S.C. 154(b) by 608 days.

(21) Appl. No.: 11/521,785

(22) Filed: Sep. 15, 2006

(65) Prior Publication Data

US 2008/0069336 A1 Mar. 20, 2008

(51) Int. Cl.
*H04M 1/00* (2006.01)
*H04M 9/00* (2006.01)

(52) U.S. Cl. .................. 379/428.02; 379/428.03; 379/433.01

(58) Field of Classification Search ................. 379/428.01–428.04, 433.01, 441, 93.17; 455/556.1, 575.1, 566; 345/156
See application file for complete search history.

(56) References Cited

U.S. PATENT DOCUMENTS

| 4,056,696 A | 11/1977 | Meyerle et al. |
| 4,124,785 A | 11/1978 | Seretny et al. |
| 5,970,418 A * | 10/1999 | Budd et al. .................. 455/566 |
| 6,130,944 A | 10/2000 | Harting et al. |
| 6,480,185 B1 | 11/2002 | Kiljander et al. |

OTHER PUBLICATIONS

W. S. Hersch and R. Laexman, "Centrix Revisited," CMP Call Center Network, www.cconvergence.com, Mar. 5, 2001, Internet.
"Wireless Presenter," Psiloc Mobile Solutions, www.psiloc.com, Mar. 1, 2006, Internet.
"Mobile Phone As Mouse," www.We-Make-Money-Not-Art.com, Feb. 2, 2006, Internet.
"Pointing Based Search Solution for Mobile Phones Debuts," www.textually.org, Jan. 31, 2006, Internet.
"Speaker Phone Mouse Pad," www.JCPenney.com, Mar. 1, 2006, Internet.
"Tel-Mouse," Phone Mouse-mouse and telephone joined together for easy surfing o the Internet, www.weterm.com, Mar. 1, 2006, Internet.
"Enjoy The Ingenious 2 in 1 Mouse Phone with Speaker Monitoring," Font USA, www.fontusa.com/MousePhone/, Mar. 1, 2006, Internet.

* cited by examiner

*Primary Examiner*—Tuan D Nguyen

(57) ABSTRACT

A telephone set suitable for sending and receiving calls and for affecting a display of call-related information on a user-viewable information display. The telephone set comprises a handset and a base. The handset includes a transmitter, a receiver, and an integrated pointing device. The integrated pointing device is configured to transmit a signal to the base in response to physical manipulation by a user. The base includes a numeric keypad for inputting phone numbers, an input for receiving the signal from the handset, and an electronic pathway that originates from the input and is directed toward the information display such that the physical manipulation of the integrated pointing device will affect the display of call-related information. Preferably, the telephone set is, by incorporation of a network interface, enabled to communicated and share call-related information through a packet-switched network.

20 Claims, 5 Drawing Sheets

TELEPHONE SET HAVING A HANDSET WITH AN INTEGRATED POINTING DEVICE

FIELD

In general, the present invention is directed to telephone sets, and in particular, digital telephone sets capable of communicating and sharing data through a packet-switched network.

BACKGROUND

Telephone sets and telephone set technologies are well-known.

Telephone sets generally include a base and a handset, the handset being communicatively linked to the base either by direct physical connection or wirelessly. The telephone base generally contains the electrical circuitry and components for receiving and transmitting telephone communication signals. The telephone base may also contain various controls and features, such as a numerical keypad, a liquid crystal or other type of display, speed dial function keys, call hold and transfer function keys, and other features and controls associated with a telephone and use thereof for initiating, conducting, and terminating a calling session.

Currently, telephone sets—particularly, so-called "landline" telephone sets—are configured, if at all, for comparatively basic, rudimentary, or otherwise limited information display functionality. The call-related information displayable on current telephone sets typically include such information as: system status (e.g., date, time, etc.), system alerts (e.g., voice mail alerts, missed calls, etc.), caller identification, elapsed call time, address book data, and the like. Access to such call-related information is typically accomplished through use of menu-driven hierarchical data trees in combination with a text-based user interface (e.g., a command line interface), navigated in certain instance by dedicated buttons on the key pad of the telephone set's base or handset.

With the rapid and escalating development of digital internet telephony, and the pervasive adoption of packet-based network and internetworking communication services, the development of landline telephone sets is gravitating towards greater connectivity with networks and networked computers, pursuing wider opportunities for developing and adding new, more elaborate, and more cost-efficient call-related functionalities and services. As these new functionalities and services are developed, there emerges a heightened desire and need to make more accessible and easy the presentation of and access to more massive amounts of call-related data and applications.

SUMMARY

In response to the above, the present invention provides a telephone set with a base and a handset, wherein the handset has an integrated pointing device for affecting presentation of call-related information on a remote user-viewable information display, the information display being provided, for example, either on the base of the telephone set and/or in a personal computer system into which said base is directly communicatively connected. The invention contemplates and enables user-control of the telephone set's local or attached information display from the handset (such as by so-called "point-and-click" and "scrolling" functionality within a graphical user interface), facilitating access of potentially vast amounts of local or remote information and/or applications, for example, during an active calling session, with little or no required contemporaneous use of a keyboard or mouse or base-integrated numeric keypad.

In particular, the present invention provides a telephone set suitable for sending and receiving calls and for affecting a display of call-related information on a user-viewable information display. The telephone set comprises a handset and a base. The handset includes a transmitter, a receiver, and an integrated pointing device. The integrated pointing device is configured to transmit a signal to the base in response to physical manipulation by a user. The base includes a numeric keypad for inputting phone numbers, an input for receiving the signal from the handset, and an electronic pathway that originates from the input and is directed toward the information display such that the physical manipulation of the integrated pointing device will affect the display of call-related information. Preferably, the telephone set is, by incorporation of a network interface, enabled to communicated and share call-related information through a packet-switched network.

In light of the above, it is a principal object of the present invention to provide a telephone set with a handset having convenient user-controlled means for affecting call-related information presented on a remote user-viewable information display.

It is another object of the present invention to provide a digital telephone set capable of communicating and sharing call-related information through a packet-switched network, the digital telephone set provided with a handset having user-controlled means for affecting call-related information presented on a remote user-viewable information display.

It is another object of the invention to provide a telephone set having a handset with an integrated pointing device.

It is another object of the present invention to provide means for remotely navigating and executing a call-related GUI display during and throughout a calling session, without required ancillary user-manipulation of a keyboard or mouse or base-integrated numerical keypad.

It is another object of the present invention to provide a telephone handset having an integrated pointing device disposed at a location suitable for human tactile manipulation as the handset is grasped by a user and positioned proximately upon the user's head during an active calling session.

For a further understanding of the nature and objects of the invention, reference should be had to the following description taken in conjunction with the accompanying drawings.

DETAILED DESCRIPTION

The present invention provides a telephone set suitable for sending and receiving calls and for affecting a display of call-related information on a user-viewable information display. The telephone set comprises a handset and a base. The handset includes a transmitter, a receiver, and an integrated pointing device. The integrated pointing device is configured to transmit a signal to the base in response to physical manipulation by a user. The base includes: a numeric keypad for inputting phone numbers; an input for receiving the signal from the handset; and an electronic pathway that originates from said input and is directed toward said information display such that the physical manipulation of the integrated pointing device will affect said display of call-related information.

Several embodiments of the invention are contemplated.

Figure 1:
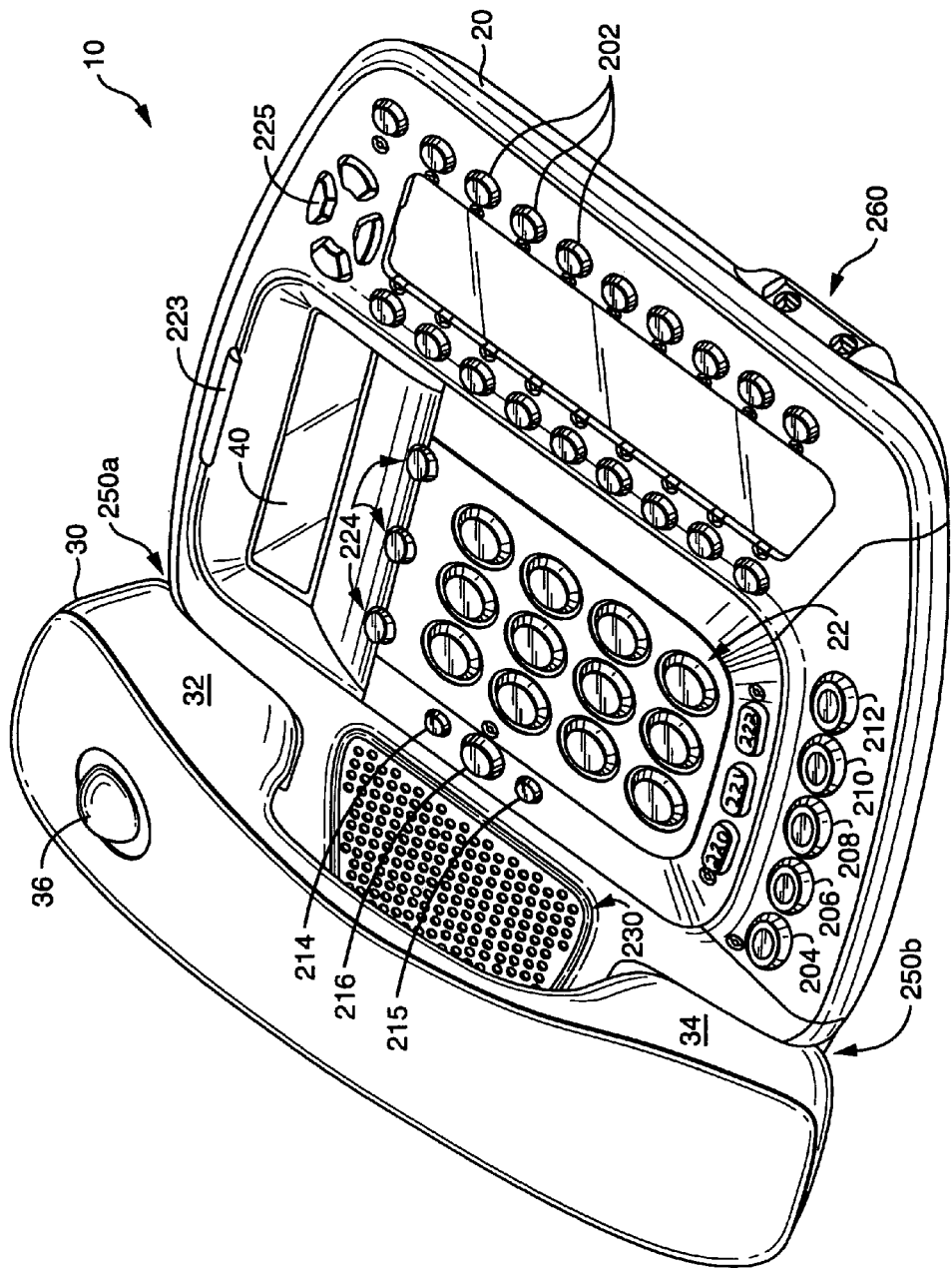
FIG. 1 illustrates a telephone set 10 having a handset 30 with an integrated point device 36 according to an embodiment of the present invention.

As shown in FIG. 1, a telephone set 10 includes a handset 30 and a base 20; and a pointing device 36 integrated into the handset 30; and—in accordance with one of said embodiments—a user-viewable information display 40 integrated into the base 20. The integrated pointing device 36 is a trackball. The user-viewable information display 40 is a flat panel display. In operation, the trackball 36 is configured to transmit a signal to the base in response to being either physically rotated (cf., a "first manipulation"), or depressed (cf., a "second manipulation"), or otherwise manipulated by a user. The signal is received into the base 20, and from there transmitted through an electronic pathway to the integrated flat panel display 40 (cf., remote from the handset), thereby affecting the display of call-related information on said flat panel display 40.

Aside from the integrated pointing device, handset 30 also comprises a transmitter and a receiver.

The transmitter is generally disposed within upper end of the handset 30's housing, and in particular, within the ear-piece end 32 thereof. The transmitter functions essentially to convert electrical audio-encoding signals into an audio broadcast perceptible to a user, when the telephone set is in use during an active calling session and the ear-piece end 32 positioned in proximity to the user's ear.

The receiver is generally disposed within the lower end of the handset 30's housing, and in particular, within the mouth-piece end 34 thereof. The receiver functions essentially to convert a user's voice into electrical audio encoding signals, when the telephone set is in use during an active calling session and the mouth-piece end 32 positioned in proximity to the user's mouth.

The circuitry and electronic components used for both transceiver and the receiver are well known, and include speakers, microphones, amplifiers, and the like. To reduce the manufacturing costs of the handset 30, analog circuitry and components can be employed for the transceiver and receiver. Additional components and circuits can be employed to convert the analog signals issuing to and from the transceiver and receiver, as well as the integrated pointing device, into a digital signal. Such analog-to-digital conversion—utilizing diverse technologies also well-known in the art—can be implemented either in the base 20, the handset 30, or remotely from the telephone set 10 (e.g., in a network gateway or internet telephony server).

Communicative linkage between the handset 30 and the base 20 can be implemented either by direct physical connection, e.g., by provision of a jack or wire line input (not shown) into the handset 30, or wirelessly, e.g., provision of an antenna, or Bluetooth or other wireless signal receiver, into the handset 30. The circuitry and electronic components for such linkages are also well-known in the art.

Among the key features of the base (or "console") 20 of the telephone set illustrated in FIG. 1 are its numeric keypad 22 and its flat panel display 40.

In a first mode of using the present invention, the numeric keypad 22 can be used in the operation of the telephone set 10 to dial phone numbers, and thus initiate an active call session. Typically, as numbers are dialed, they are displayed—alone or in combination with other contemporaneously-generated call-related information—on the flat panel display 40. In an alternative mode of use, initiation of a call session is effected by selecting a phone number from a displayed menu by manipulation of the integrated pointing device 36 on the handset 30.

Both the first and alternative modes are contemporaneously enabled in the telephone set, thus selectable at the discretion and convenience of the user, depending for example on the user's proximity to or facility with the base 20 or handset 30. Likewise, either the keypad 22 (on the base 20) or the pointing device 36 (on the handset 30) can be employed during (or outside) an active call session, for example, to enter numeric information (for example, when prompted by an automated telephone operator) or to input information for access, support, or maintenance of phone features or services.

As illustrated in FIG. 1, the flat panel display 40 is integrated into the base 20 at a location providing good user visibility, thus enabling good display of call-related information to a user during or outside an active call session. The display 40 is integrated such that it is in direct or indirect electronic communication with and can thus be affected by manipulation of the integrated pointing device 36 on the handset 30.

The present invention is not particularly limited in respect of the integration of any particular flat panel display. Flat panel displays are well known in the art, the several types of which include liquid crystal displays, so-called OLED (organic light emitted diode) displays, electroluminescent displays, electrophoretic displays, and the like. Any of these can be employed. However, owing to the rich functionality contemplated in preferred embodiments, the display should have a resolution (horizontal and vertical) greater than 72 dpi (dots per inch) and a minimum 4-bit color palette.

Other important components of the base 20 include, a form-fitting saddle 250a, 250b for couching the handset when not in use or when on speaker mode; an alternative power source input 260; a speaker housing 260; a network input (not shown); and a complement of various user interface keys.

Form-fitting saddle 250 is essentially a conformation of the housing 20 used to receive and seat handset 60, and in that regard comprises a mouthpiece seat 250b, for receiving mouthpiece 34, and earpiece seat 250b, for receiving earpiece 32. Although obscured by the handset 30 in FIG. 1, a "hook" or switch is provided in earpiece seat 250a that signals when the handset is placed on base 20, which can either indicate the termination of a call or activating or facilitating speakerphone functionality.

Alternative power source input 260 provides a means for inputting power into the telephone set 10, for example, when the user's telephone networking system does not provide power through its phone lines. As is well known, in public switched telephone network (PSTN) systems, power is supplied through the same phone cable used to connect the telephone set to the telephone network. Likewise, certain ethernet network interfaces—relevant to VoIP-related embodiments of the invention—will include so-called "power over ethernet" (POE) functionality, thus allowing for power to be supplied through the same ethernet cable used to connect a VoIP-configured telephone set to a host packet-switched network. Regardless, these and like conventions are not universal. Providing an alternate power supply input 260 adds flexibility.

Speaker housing 230, provided in the housing of base 20, essentially encloses or otherwise holds the electronic components used for the telephone set's speaker, often activated and in use by engaging a so-called "speakerphone" function, allowing others in the audio proximity to participate in an active call session.

Although not shown, in the rear side of base 20, there are disposed network inputs and outputs, including inputs and outputs for connecting the telephone set 10 to both PSTN phone networks and ethernet-VoIP networks.

Access and control of the potentially numerous features of the telephone set is enabled by a collection of user interface keys. Beyond the ability to dial numbers using numeric keypad 22, other features and functions are considered optional, but nonetheless desirable. In this regard, for purpose of illustration only, telephone set 10 includes volume controls (higher 214, lower 216, and mute 215), which are often used during a "speakerphone" session; voicemail keys and indicator (block voicemail 220 with indicator light, retrieve voice mail 221, forward voicemail 222, and "unread" voicemail indicator light 223), flat panel display menu navigation and execution keys 225 (which enables a user some navigation/execution functionality on the base 20 itself, rather than using the integrating pointing device 36, for example, during pre-call or off-call phone operation); and a set of user-definable function keys 202.

Figure 2A:
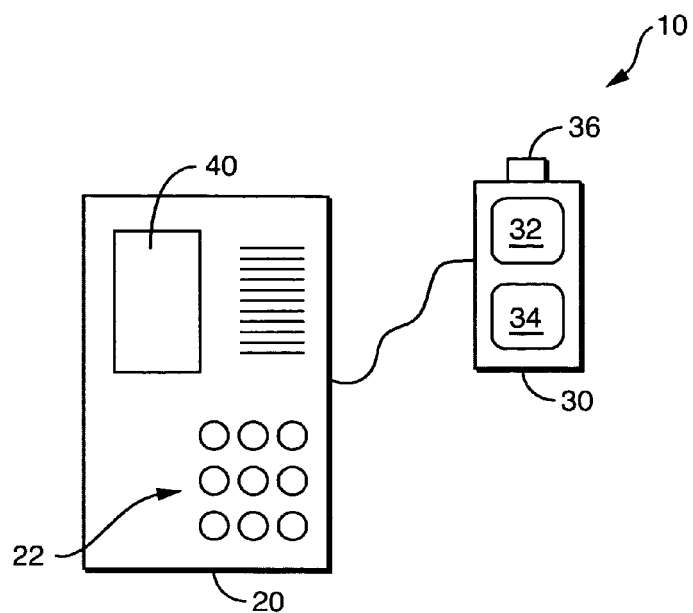
FIGS. 2A and 2B illustrate schematically variant contextual relationships between the handset 30 and base 20 of the present invention, as well as a personal computer system 70, and the user-viewable displays $40_{(a,b)}$ of either the base 20 and/or the personal computer system 70.

A typical deployment of the telephone set 10, according to present invention is illustrated schematically in FIG. 2A. As shown therein, the handset 30 communicates with base 20 by means of a direct physical connection (i.e., the wire line connection between handset 30 and base 20). According to this deployment, call-related information is displayed to a user on a flat panel display device 40 that is integrated into the base 20. Call-related information can be inputted by the user into the telephone set either by means of the numeric keypad 22 integrated into the base 20, or by means of the pointing device 36 integrated into the handset 30. Use of the integrated pointing device 36—whilst optional—affords a convenience, providing ergonomic functionality, that would be desirable to users who place a high-volume of calls and/or place calls in an environment wherein too frequent access to the base 20 during and between calls interrupts or otherwise hinders one's preferred calling behavior.

Figure 2B:
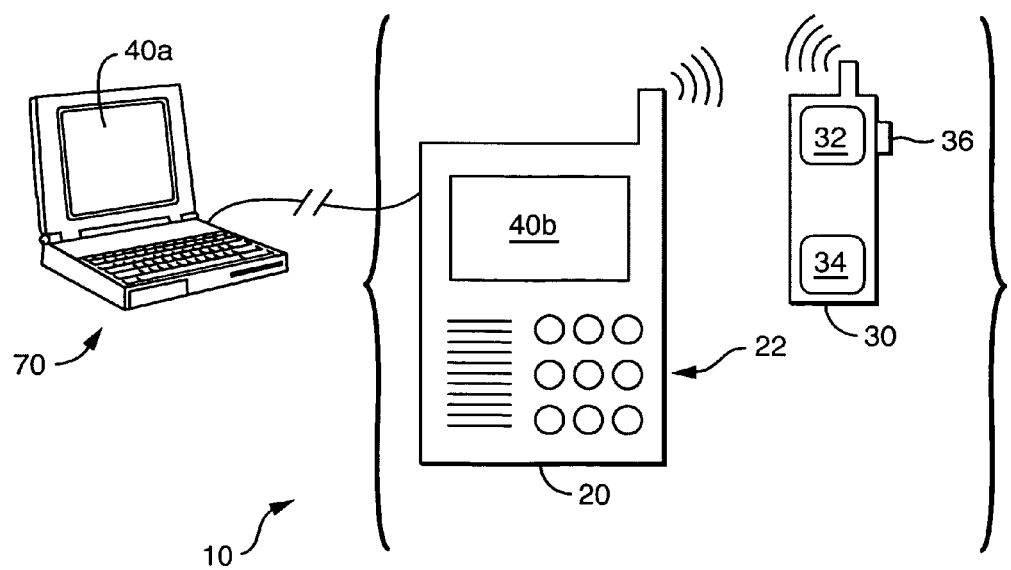

As illustrated in FIG. 2B, in certain embodiments, it is unnecessary for the handset 30 to be physically connected to the base 20, nor is it always necessary for the user-viewable information (i.e., the display under the control of the integrated pointing device 36) to be integrated into the base 20.

In respect of the base-handset connection, rather than having a direct physical connection, greater mobility can be advanced by linking base 20 to the handset 30 wirelessly, as shown in FIG. 2B. To provide wireless connectivity, the base 20 and handset 30 are provided with matching wireless transmitters and receivers, as is well known in the art.

In respect of user-control of a remote display, in certain preferred "internet telephony"-related embodiments, wherein the telephone set is configured for VoIP telephony application, the base 20 will be communicably linked to, for example, a user's personal computer. The communication link can be direct or indirect, and can employ either wireless or wired connections.

When communicably linked to a personal computer, the phone set 10 can be downstream or upstream of the personal computer. In the former, the personal computer 70 would be linked more proximately to a phone network. In the latter, the telephone set would be more proximate.

In VoIP-telephony applications, it is possible for the user's telephone set and personal computer system to be linked separately to the host packet-switched network. Certain VoIP telephone set configurations allow serial connection with a user's personal computer, requiring connection of the resultant combination to only a single open network port. This is desirable particularly in user environments short of available, active, and/or installed ethernet jacks.

When connected to a personal computer, it is possible to configure the combination such that all, some, or additional call-related information is displayed on the typically much larger, presumably more easily viewable, display 40a provided within a personal computer system. To enable control of call-related information on the display, a telephone set configuration can be employed to control said display 40a by user manipulation of the integrated pointing device 36. This can be accomplished either with control of any display 40b provided on base 20 turned off or eliminated, or with coordinated controls of both integrated display 40b and 40a. For the latter, it is envisioned that a user-could switch back and forth between "active" displays, as selected by the user, for example, during an active phone call session.

Where a telephone set is used in conjunction with a user's personal computer 70a (which can be either laptop or desktop type arrangements), such will typically be co-located in the user's proximate working area.

Regardless of whether the call-related information display 40 is located on the base 20 or as a component of a personal computer in communication therewith, the present invention contemplates that said display 40 will preferably employ a so-called "graphical user interface" (GUI), rather than a so-called "command line interface".

As known to those skilled in the art, GUIs were introduced in reaction to the steep learning curve of command line interfaces (CLI), text-based user interfaces requiring commands to be typed on the keyboard. Since the command words in CLIs are usually numerous and composable, very complicated operations can be invoked using a relatively short sequence of words and symbols. This leads to high levels of efficiency once the many commands are learned, but reaching this level can take some time, because the command words are not easily discoverable. While the use of GUI facilitates access and execution of the potentially voluminous call-related information that one could expect as IP telephony introduces ever-escalating features, the employment of such interface in the past was frustrated in part because of the limited user-inputs (i.e., keys and navigation buttons) found in standard telephone layouts. The inclusion of the integrated pointing device into the telephone set, in accordance with the present invention, provides the so-called "point-and-click" functionality that makes more feasible the use of a GUI.

Figure 3A:
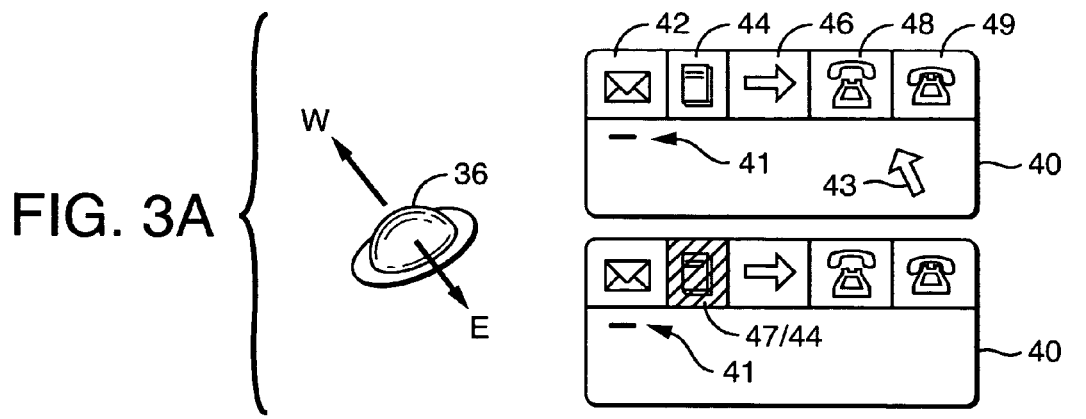
FIGS. 3A, 3B, and 3C illustrate the navigation and control of a GUI by the manipulation of the integrated pointing device, according to a simplified mode of practicing the present invention.
Figure 3B:
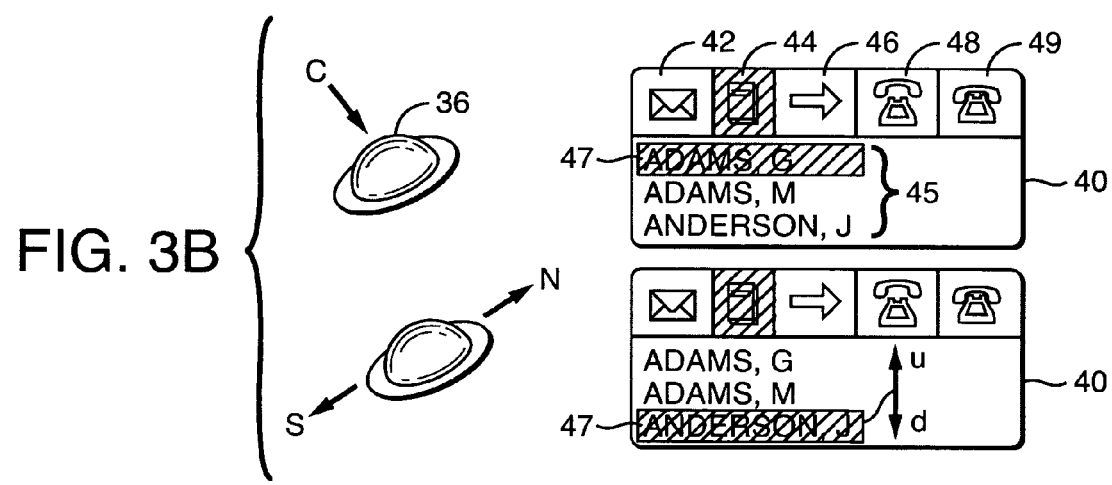
Figure 3C:
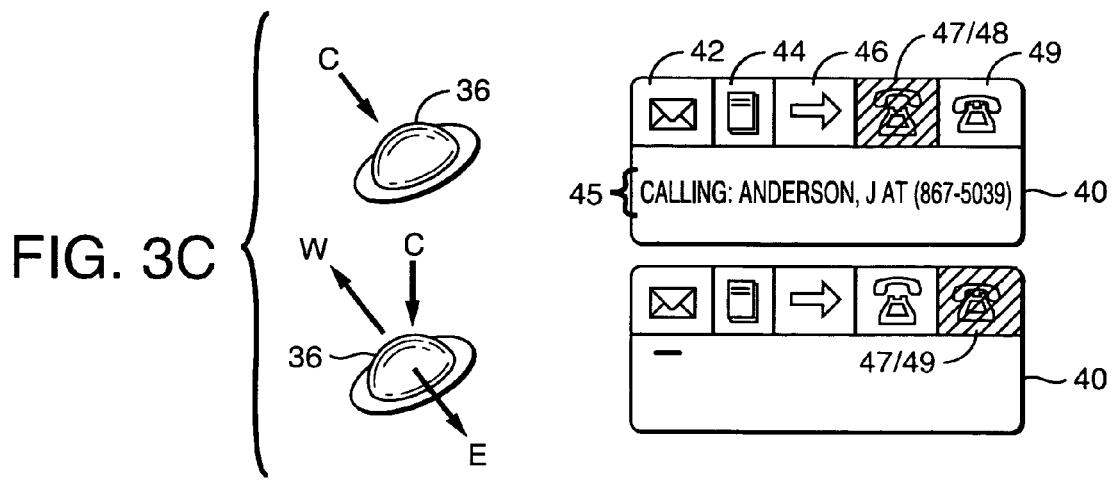

FIGS. 3A, 3B, and 3C illustrate schematically an example of the operation of a representative integrated pointing device 36 in the navigation and execution of a GUI for call-related information on an base-integrated display 40. The operation is essentially the searching of a telephone contact from a telephone contact database and placing a call thereto.

Starting first at FIG. 3A, access into the telephone's features and data is accomplished by navigating and selecting from the following set of graphical icons at the top menu bar of GUI display 40: Access Voice Mail 42, Access Address Book 44, Forward Calls 46, Initiate Call 48, and Terminate Call 49. The telephone functions are simplified and reduced for purpose of illustration herein.

For more feature-rich telephony application, the GUI will contain access to several call-related telephone functions, for example, conference calling, access and management of client billing databases, internet-based searching capability, call history access, multi-line management, and the like. Unlike the single-tier of menu functions in the example of FIGS. 3A to 3C, when several telephone features and functions are implemented, as is likely, such features and functions are preferably accessed through a multi-tiered graphical menu system.

Also illustrated in GUI display 40 is a cursor 41 and a pointer 43. Although not implemented in this particular operation, these GUI components are commonly found in GUI displays, and hence, can also be implemented in GUI displays of the present invention. Cursors, for example, will generally denote a prompt for text-based input, such as the dialing of a telephone number by a user from the base keypad 22. The pointer, for example, can be used in combination with the integrated pointing device to select and activate GUI components.

As shown in FIG. 3A, finding a telephone number from the phone database of contact information commences by removing the handset 30 from the base 20, thus activating the GUI display 40. By then manipulating the integrated point device 36 on the handset 30, for example, by rotating the roller ball in a lateral direction W-E, the user can sequentially highlight 47 each of the graphical icons 42, 44, 46, 48, and 49 on the menu bar, ultimately settling on and thus highlighting Access Address Book Icon 47/44.

Once the desired function is highlighted, the integrated pointing device is further manipulated by the user to access that function. As will be discussed in connection with FIGS. 5A-5D, different integrated pointing devices will vary in the manner in which activation is effected. In the trackball 36 shown in FIG. 3B, activation is effected by depressing (i.e., clicking) the trackball. Activation of the highlighted icon 47/44 leads to the execution in the telephone set of the access, retrieval, and display of telephone saved contact data. A list of telephone contacts 45 is thus produced, through which the user can sequentially scroll and highlight 47 each of the contacts, up and down U-D the list, by rotating the trackball 36 along a substantially orthogonal axis N-S.

Assuming that the user wishes to place a call to "Anderson, J", the trackball 36 is manipulated such that the highlight 47 settles on that contact item. Once highlighted, as shown in FIG. 3C, the call is initiated by once again "clicking" the trackball 36. The on-call icon 48 in the menu bar becomes highlighted and the GUI display 40 displays status information 45 regarding the call.

To terminate the call, as shown in FIG. 3D, the user manipulates trackball 36 (i.e., by rotation thereof along axis W-E) to navigate the highlight 47 sequentially through the graphical icons 42, 44, 46, 48, 49 in the menu bar, ultimately settling upon the Terminate Call icon 49. "Clicking" the trackball, when this icon is highlighted terminates the calling session, returning the GUI display to its initial state, as shown in the beginning of FIG. 3A.

The entire process illustrated in FIGS. 3A, 3B, and 3C is executable by a user without any required manipulation of functions or keys on the telephone set base 20, the entire selection and calling process being executable by navigating a GUI through the handset's integrated pointing device 36. While this particular operation is simplified for presentation herein, the convenience to the user which this invention advances will be better appreciated, for example, in the context of high-volume calling operations wherein access into voluminous call-related data and execution of complex phone operations is common. In such situations, navigating through deep and detailed command line interfaces by punching keys on a phonebase (or handset) keypad could prove paralytically cumbersome.

Inasmuch as convenience is a principal objective of the present invention, the placement of the integrated point device 36 in the handset 30 is of central importance. Toward this end, the pointing device should be integrated into an area of the handset easily accessed and manipulated by a user with the same hand used to grasp the phone, thus avoiding the need to interrupt an active-calling session to manipulate the pointing device. This would enable a user to manipulate the integrated pointing device without having to interrupt or modify inordinately normal in-call handset use during an active in-call session.

In this regard, as shown in FIG. 2C, a typical handset 20 useful for the present invention can be conceptually divided into certain zones or regions, each being generally definable with respect to the location of the handset's earpiece 32 and mouthpiece 34.

A central region $30_C$ is definable as the region of the handset 20 falling on an orthogonal axis M-M approximately midway between the earpiece 32 and the mouthpiece 34. The central region is typically the region of the handset that a user will grasp during an active calling session, positioning the earpiece 32 proximate the user's ear and the mouthpiece 34 proximate the user's mouth. As continuous uninterrupted grasping of the handset is desired throughout an active calling session, locating the integrated pointing device in the central region $30_C$ is undesirable because, if not otherwise obstructed, user-manipulation would likely require repositioning or release of a user's grasp.

On the side opposite the central region, earpiece regions and mouthpiece regions can be defined. The earpiece regions, which generally lay above the central region $30_C$, essentially forming the earpiece 32, comprises in pertinent part a top region $30_T$ (which is the region opposite the surface of the earpiece that faces the user's ear) and the left-side, top-side, and right-side regions $30_{STL}$, $30_{ST}$, and $30_{STR}$ contiguous therewith. The mouthpiece regions, which generally lay below the central region $30_C$, essentially forming the mouthpiece 34, comprises in pertinent part a bottom region $30_T$ (which is the region opposite the surface of the earpiece that faces the user's mouth) and the left-side, top-side, and right-side regions $30_{SBL}$, $30_{SB}$, and $30_{SBR}$ contiguous therewith.

Figure 4:
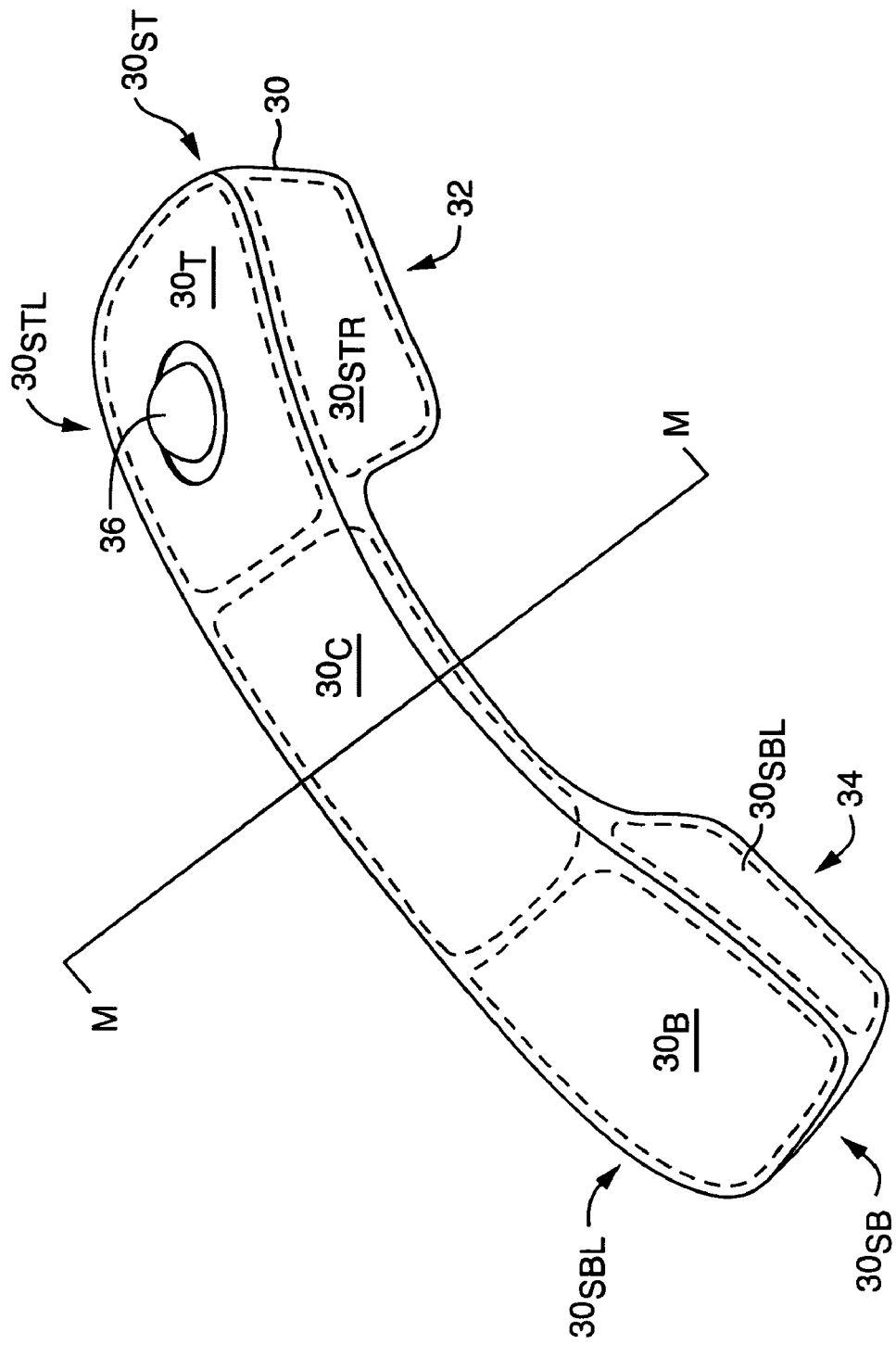
FIG. 4 illustrates an embodiment of the inventive handset 30 showing in particular, preferred and potential locations for the disposition of the integrated pointing device.

When a user grasps the handset 30 along central region $30_C$ during a calling session, it would be very difficult for a user of normal dexterity to manipulate an integrated pointing device 36 if positioned in any of the bottom regions $30_T$, $30_{SBL}$, $30_{SB}$, and $30_{SBR}$. In contrast, as shown in FIG. 4, if located at top region $30_T$, a user of normal dexterity can manipulate the integrated pointing device 36, with comparative ease and with good freedom of physical movement, utilizing the user's thumb or index finger, whilst still grasping the handset in operative in-call position with the user's palm and remaining fingers. Accordingly, the preferred location for the integrated pointing device 36 on the handset is the top region $30_T$, which is above the central region grasped by a user and essentially opposite the surface of the surface of the earpiece 32 that faces the user's ear.

As an alternative to top region $30_T$, a user could also manipulate an integrated pointing device 36 located on the left-side, top-side, and right-side regions $30_{STL}$, $30_{ST}$, and $30_{STR}$ of the handset, using either the user's thumb or index finger. Locating the integrated pointing device in any of these regions would likely come at some sacrifice to the user's freedom of operation, but these can be either mitigated or overcome by selection and proper ergonomic design of the integrated pointing device 36, and would thus still be desirable for certain embodiments of the present invention.

The vastness and diversity of available mechanical configurations for pointing devices adapted for navigating a graphical user interface is understood. It is not however contemplated that the invention is limited to the use of any particular one of these configurations. The invention relies here not upon structure, but rather function: That is, the capacity of the pointing device to transmit a direction-encoding signal to said base in an algorithmically-correlated response to a directional physical manipulation thereof by a user. To promote intuitive control and ease of use, pointing device configurations that offer greater diversity and resolution in the sensing and encoding of directional motion (e.g., up, down, left, right, diagonal, forward, backward, clockwise, counter-clockwise, etc.), with fewer manipulatable elements, are preferred.

Representative examples of pointing devices that can be integrated into a handset in accordance with the present invention are illustrated schematically in FIGS. 5A, 5B, 5C, and 5D.

Figure 5A:
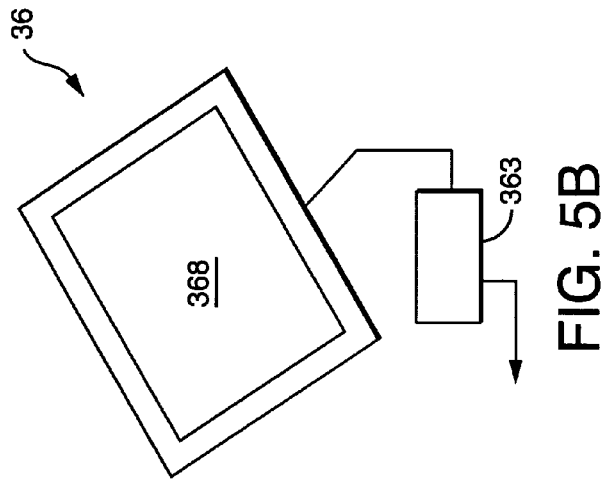
FIGS. 5A, 5B, 5C, and 5D illustrate several types of integrated pointing devices useful in present invention.

A trackball-type pointing device 36 is illustrated in FIG. 5A, the pointing device comprising a trackball 368 seated upon and contiguous with a plurality of rollers 362, 364, and 366. The trackball 368 is seated such that it is capable of being rotated along any axis, and whereby said rotation effects corresponding rotation of the contiguous rollers 362, 364, and 366. Controller 363 senses the direction and speed of the rotation of the roller 362, 364, and 366, and in response thereto generates and transmits a signal to the telephone base, ultimately effecting the display of call-related information. By enabling the rollers to be displaced in response to the depression of the trackball 368, another form of motion can be sensed by the controller and translated into a transmittable signal. Alternatively, the trackball can be used in conjunction with proximately located buttons programmed for the same purpose, as is well known in the art.

Figure 5B:
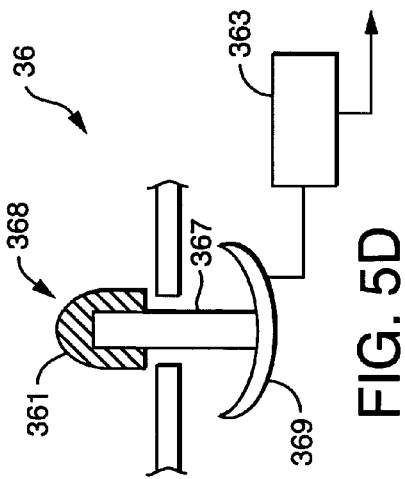

A touchpad-type pointing device 36 is illustrated in FIG. 5B, the pointing device comprising a touch sensitive surface (e.g., piezoelectric panel) capable of generating or modifying a electrical impulse(s) based on the location of the surface where pressure is applied or on local changes in resistance or conductance thereof. These signals are sensed by controller 363 and in response thereto generates and transmits a signal to the telephone base, ultimately effecting the display of call-related information. By enabling the touch sensitive pad to sense, for example, so-called "double taps" by a user, another form of motion is sensed by the controller and translated into a transmittable signal. Alternatively, as with the trackball, the touch pad 368 can be used in conjunction with proximately located buttons (not shown) programmed for the same purpose, as is well known in the art.

Figure 5C:
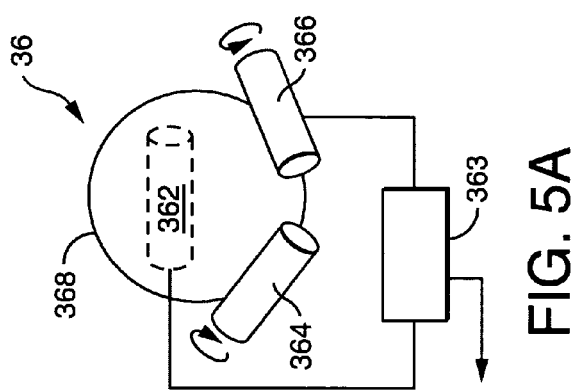

A disk-style pointing device is illustrated in FIG. 5C, the pointing device comprising an outer ring ($368_{N,S,W,E}$) capable of being spun in clockwise and counterclockwise directions, as well as being toggled substantially toward north $368_N$, south $368_S$, west $368_W$, and east $368_E$ poles, and a central button $368_C$, capable of being depressed. The rotation, toggling, and depression are sensed by controller 363 and in response thereto generates and transmits a signal to the telephone base, ultimately effecting the display of call-related information.

Figure 5D:
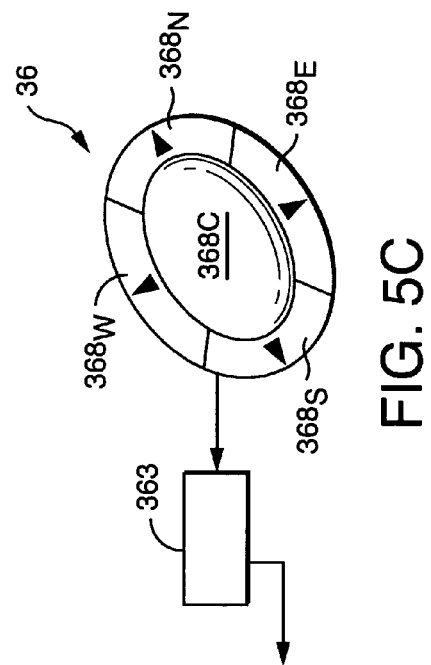

Finally, a joystick-style pointing device is illustrated in FIG. 5D, the pointing device 368 comprising a pole 367 mounted at its lower end on an concave base or "rocker" 369 in a manner that allows the pole to be pivoted along a broad range of pivot angles, when the upper end of the pole 367 is prodded by a user. Controller 363 senses the relative motion of the rocker 369, and in response thereto generates and transmits a signal to the telephone base, ultimately effecting the display of call related information. Toward this end, for use in the present invention, the upper exposed portion of the pole should be appropriately sized for manipulation by a user finger. A coarse gritty outer casing 361 on this exposed portion of pole 367 could be used to provide good friction, thus minimizing slippage during manipulation. By mounting the rocker assembly on, for example, a spring loaded supporting assembly (not shown), another form of motion (i.e., "clicking") can be sensed by the controller and translated into a transmittable signal.

Although certain embodiments of the invention are disclosed, those skilled in the art, having the benefit of the teachings herein, can affect numerous modification thereto. These modifications are to be construed as encompassed within the scope of the present invention as set forth in the appended claims.

The invention claimed is:

1. A telephone set suitable for sending and receiving calls and for affecting a display of call-related information on a user-viewable information display, the telephone set comprising a handset and a base, wherein:
    the handset includes a transmitter, a receiver, and an integrated pointing device, said integrated pointing device configured to transmit a signal to said base in response to physical manipulation by a user; and
    the base includes (a) a numeric keypad for inputting phone numbers, (b) an input for receiving said signal from the handset, and (c) an electronic pathway that originates from said input and is directed toward said information display such that said physical manipulation of said integrated pointing device will affect said display of call-related information.

2. The telephone set of claim 1, wherein said user-viewable information display is integrated into the base.

3. The telephone set of claim 2, wherein the base further includes electronic circuitry configured to produce a graphical user interface on said user-viewable information display, said graphic user interface including at least said call-related information and a movable pointer.

4. The telephone set of claim 3, wherein a first manipulation of said integrated pointing device moves the location of said movable pointer on said graphical user interface.

5. The telephone set of claim 4, wherein a second manipulation of said integrated pointing device affects said call-related information as a function of the location of said movable pointer at the time of said second manipulation.

6. The telephone set of claim 1, wherein said integrated pointing device is a trackball.

7. The telephone set of claim 1, wherein said integrated pointing device is a touch pad.

8. The telephone set of claim 1, wherein said integrated pointing device is a joystick.

9. The telephone set of claim 1, wherein said handset and said base are physically communicatively connected.

10. The telephone set of claim 1, wherein said handset and said base communicate wirelessly at radio frequencies.

11. A digital telephone set capable of communicating and sharing call-related information through a packet-switched network, the digital telephone set comprising a handset and a base, wherein:
    the handset includes a transmitter, a receiver, and an integrated pointing device, said integrated pointing device configured to transmit a signal to said base in response to physical manipulation by a user; and the base includes (a) a network interface capable of connecting the digital telephone set to a said packet-switched network and thereby enabling said communication and sharing of said call-related information through said packet-switched network; (b) a numeric keypad for inputting phone numbers, (c) an input for receiving said signal from the handset, and (d) an electronic pathway that originates from said input and is directed toward a user-viewable information display such that said physical manipulation of said integrated pointing device will affect a display of call-related information on said information display.

12. The digital telephone set of claim 11, wherein said user-viewable information display is incorporated into the base.

13. The digital telephone set of claim 12, wherein the base further includes electronic circuitry configured to produce a graphical user interface on said user-viewable information display, said graphic user interface including at least said call-related information and a movable pointer.

14. The digital telephone set of claim 13, wherein a first manipulation of said integrated pointing device moves the location of said movable pointer on said graphical user interface.

15. The digital telephone set of claim 14, wherein a second manipulation of said integrated pointing device affects said call-related information as a function of the location of said movable pointer at the time of said second manipulation.

16. The digital telephone set of claim 11, wherein said integrated pointing device is a trackball.

17. The digital telephone set of claim 11, wherein said integrated pointing device is a touch pad.

18. The digital telephone set of claim 11, wherein said integrated pointing device is a joystick.

19. The digital telephone set of claim 11, wherein said handset and said base are physically communicatively connected.

20. The digital telephone set of claim 11, wherein said handset and said base communicate wirelessly at radio frequencies.

* * * * *